(12) United States Patent
Wu et al.

(10) Patent No.: US 7,453,688 B2
(45) Date of Patent: Nov. 18, 2008

(54) MULTIMEDIA DEVICE FOR PORTABLE COMPUTERS

(75) Inventors: Yaz-Tzung Wu, Taipei (TW); Ming-Yuan Liu, Taipei (TW)

(73) Assignee: Inventec Corporation, Taipei (TW)

( * ) Notice: Subject to any disclaimer, the term of this patent is extended or adjusted under 35 U.S.C. 154(b) by 1119 days.

(21) Appl. No.: 10/765,939

(22) Filed: Jan. 29, 2004

(65) Prior Publication Data
US 2005/0168924 A1  Aug. 4, 2005

(51) Int. Cl.
*G06F 1/16* (2006.01)
(52) U.S. Cl. ...................................... 361/683
(58) Field of Classification Search .................. 361/683
See application file for complete search history.

(56) References Cited

U.S. PATENT DOCUMENTS

| | | | |
|---|---|---|---|
| 5,880,928 A * | 3/1999 | Ma | 361/683 |
| 6,118,653 A * | 9/2000 | Kim | 361/683 |
| 6,163,326 A * | 12/2000 | Klein et al. | 345/156 |
| 6,181,550 B1 * | 1/2001 | Kim | 361/683 |
| 6,205,021 B1 * | 3/2001 | Klein et al. | 361/683 |
| 6,256,194 B1 * | 7/2001 | Choi et al. | 361/683 |
| 6,587,151 B1 * | 7/2003 | Cipolla et al. | 348/373 |
| 7,126,816 B2 * | 10/2006 | Krah | 361/683 |
| 7,274,562 B2 * | 9/2007 | Nakajima et al. | 361/683 |

FOREIGN PATENT DOCUMENTS

| | | |
|---|---|---|
| TW | 352206 | 2/1999 |
| TW | 373743 | 11/1999 |
| TW | 500243 | 8/2002 |

* cited by examiner

*Primary Examiner*—Lisa Lea-Edmonds
(74) *Attorney, Agent, or Firm*—Muncy, Geissler, Olds & Lowe, PLLC

(57) ABSTRACT

A multimedia device adapted for use on portable computers is movably mounted on a portable computer which consists of a first member and a second member that are openable and foldable relative to each other. When the portable computer is opened, the multimedia device may be turned to a use position. The multimedia device has a latch member turnable to latch and couple the first and second members in a closed condition when they are moved too close to each other for folding.

8 Claims, 5 Drawing Sheets

MULTIMEDIA DEVICE FOR PORTABLE COMPUTERS

FIELD OF THE INVENTION

The present invention relates to a multimedia device mounted on a portable computer that is extendable and folding, and particularly to a multimedia device that has a latch function adopted for use on portable computers.

BACKGROUND OF THE INVENTION

With advances of research and development of the information industry, a large number of portable computers has been launched on the market, such as the mobile phone, personal digital assistant (PDA), notebook computer, and the like. These portable computers are convenient to carry. While they might be slightly less powerful than desktop computers, their functions and capabilities are sufficient to meet the requirements of general users.

For portable computers that are extendable and folding, multimedia accessories such as small video cameras, microphones, and audio equipment are now available. For instance, ROC patent publication Nos. 373743 (abbreviated in No. 743), 352206 (abbreviated in No. 206) and 500243 (abbreviated in No. 243) have disclosed related techniques.

No. 743 mainly provides an "Adjustable video camera structure for notebook computers". It is connected to one side of a notebook computer and may be freely turned to a selected angle to take pictures. The video camera has to be installed and detached. It becomes an annoyance to users. Moreover, when in use, it is easily hit by external forces, which causes damage.

No. 206 discloses a "Hidden image taking device for notebook computers". It offers an improvement design over No. 743. The video camera is installed in the display panel to facilitate storing. However, it cannot be turned freely to a desired angle to take pictures as No. 743 does.

No. 243 discloses an "Extendable notebook computer video camera". It can be extended outwards for a selected distance and can be turned relative to the display panel to allow users to adjust the angle to take pictures. It may be stored in the display panel when not in use. It has the advantages of the previous two references. However, the display panel has to form a housing section on the topside to hold the video camera. And the display panel also has to reserve a space to hold the transmission line for connecting the video camera to the notebook computer. Otherwise, the extending range of the video camera is limited. In other words, this case greatly shrinks the visual scope of the display panel or the overall size of the display panel has to be increased. It cannot meet the slim and light requirements of the modern electronic products.

SUMMARY OF THE INVENTION

Therefore the invention aims to provide a multimedia device for portable computers that is adjustable to a desired use position and has a latch function.

The multimedia device for portable computers according to the invention is adopted for use on a portable computer which has a first member and a second member that are extendable and folding relative to each other. The multimedia device is movably mounted on the first member. When the first member and the second member are unfolded relatively to each other, the multimedia device may be turned to a use position for operation. The multimedia device has a movable latch member with an exposed hook. When the first member and the second member are closed and folded, the multimedia device can be turned to a coupling location along the folding direction of the portable computer to be housed in the second member. The latch member can latch on the second member to maintain the first member and the second member in a closed state in normal conditions.

The multimedia device for portable computers according to the invention contains electronic elements to provide multimedia video and audio functions such as taking pictures, entering or broadcasting sound. Its operation angle may be dynamically adjusted according to use conditions. Hence it provides an excellent maneuverability and also provides a latch coupling function when the portable computer is closed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DESCRIPTION OF THE PREFERRED EMBODIMENTS

Figure 1:
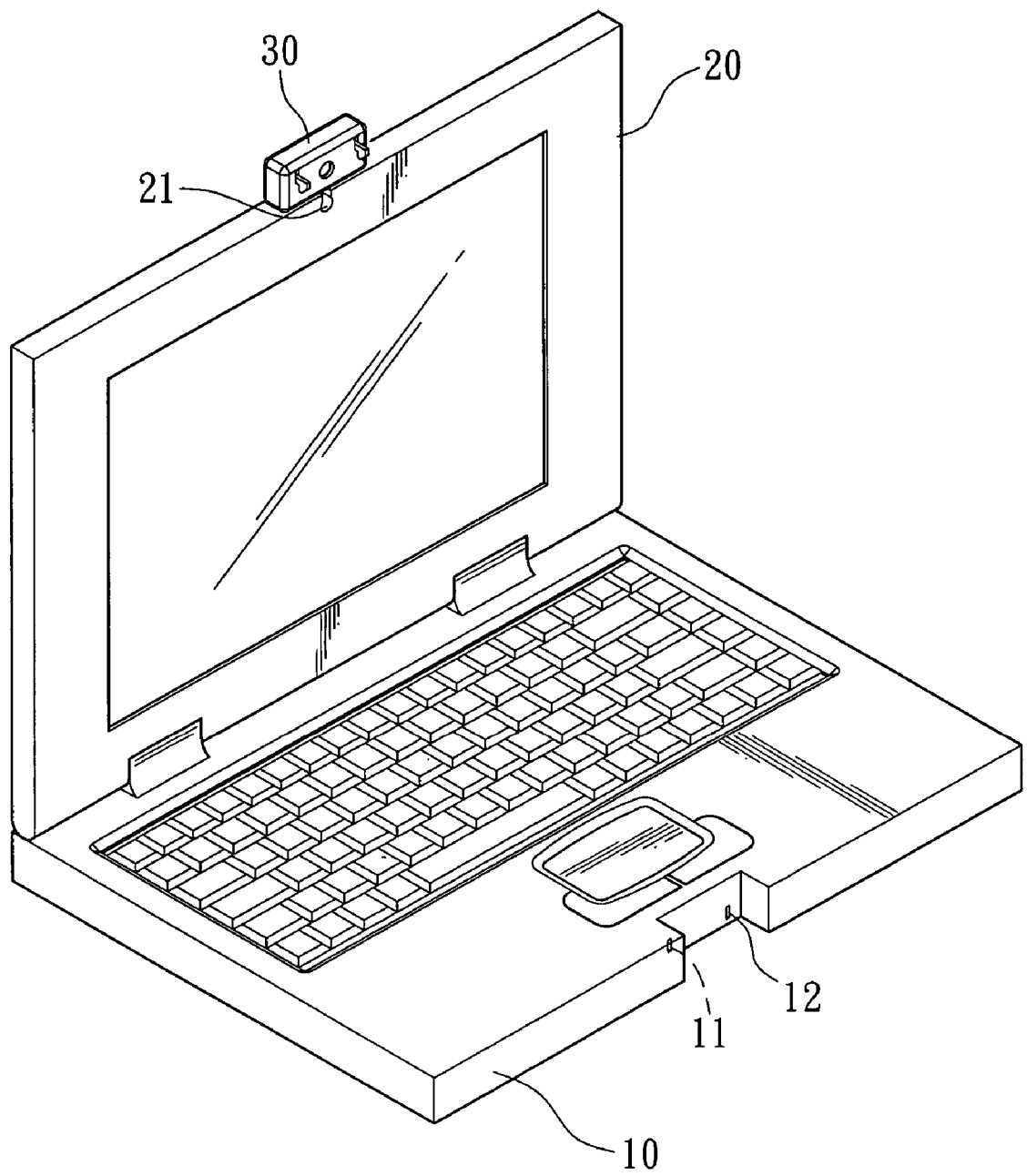
FIG. 1 is a schematic view of the multimedia device of the invention adopted for use on a portable computer in an open condition.

The multimedia device for portable computers according to the invention is adopted for use on a portable computer. Referring to FIG. 1, the portable computer has a first member and a second member that are extendable and folding relative to each other. In one embodiment the first member is a display panel 20 of the portable computer, while the second member is a host body 10 of the portable computer. The multimedia device 30 is movably mounted on one side of the display panel 20. The host body 10 has a housing trough 11, corresponding to the multimedia device 30. The housing trough 11 has latch slots 12 on the bottom side thereof.

Figure 2:
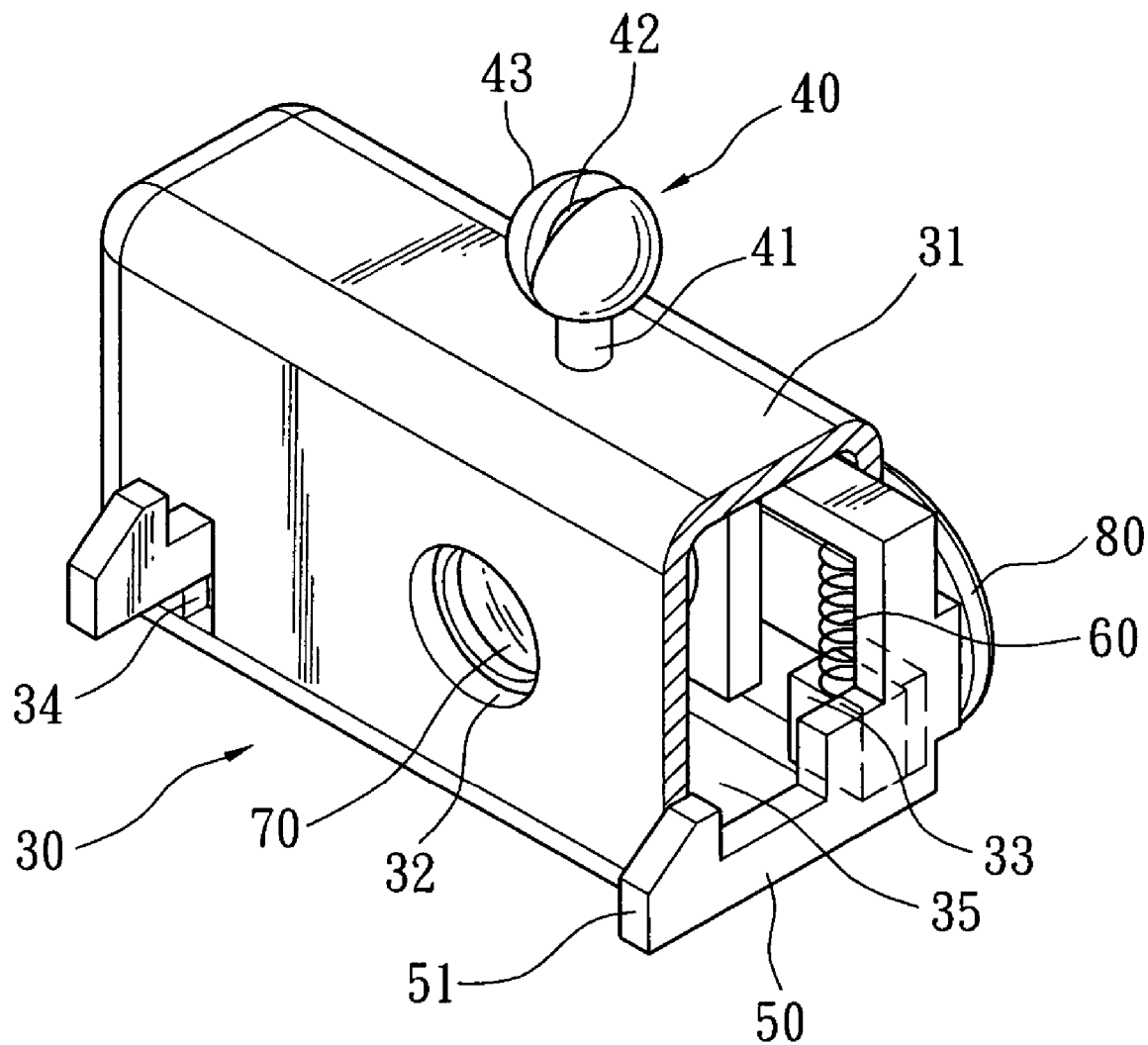
FIG. 2 is a fragmentary sectional view of the multimedia device of the invention.
Figure 3:
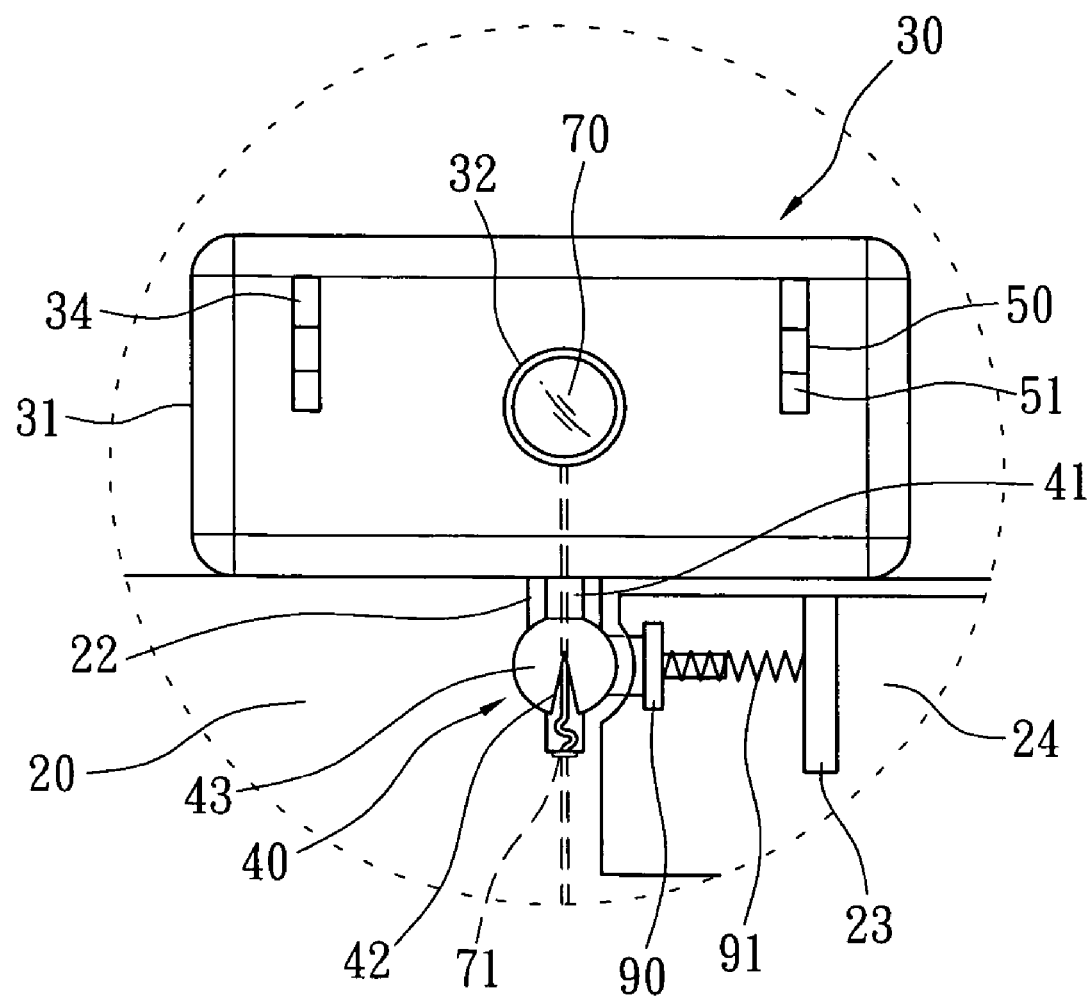
FIG. 3 is a schematic view of the multimedia device of the invention.

Refer to FIGS. 2 and 3 for the structure and assembly conditions of the multimedia device 30. The multimedia device 30 mainly includes a case 31 and a latch member 50. The case 31 is substantially a hollow body including a housing compartment 35 for housing a plurality of electronic elements (not shown in the drawings) such as a video camera module, audio equipment or sound receiving module (such as a microphone), and the like. A video camera module is illustrated in the drawings as an example. The video camera module mainly includes a video lens 70 for taking pictures.

The case 31 has an opening 32 corresponding to the video camera module 70 to enable the video lens 70 to be exposed partly outside the case 31. The latch member 50 is located in the housing compartment 35. It is extended to form a hook 51 outside the case 31. The case 31 has a notch 34 corresponding to the hook 51 to allow the hook 51 to be exposed outside. An elastic member 60, such as a spring, is located in the housing compartment that has one end connecting to the latch member 50. There is a retaining member 33 located on the mounting location of the elastic member 60 in the housing compartment 31 to block another end of the elastic member 60. Hence the elastic member 60 has a compression returning force pushing the latch member 50 to allow the latch member 50 to be moved linearly on the case 31. There is also a bucking member 80 connecting to the latch member 50 corresponding to another side of the hook 51 exposed outside the case 10. The bucking member 80 has one side forming a plurality of ridges 81 (referring to FIG. 5) to enable users to apply forces thereon to control the movement of the latch member 50.

There is a pivotal member 40 corresponding to where the case 31 and the display panel 20 are coupled. The pivotal member 40 has a distal end forming a spherical coupling section 43 which has a through aperture 42 running through a housing space 225 to allow a connection line 71 of the electronic elements contained in the housing compartment 35 to extend and run through to electrically connect to the host body 10 to establish electric connection for transmitting data. The pivotal member 40 further has a shrunk neck 41, which has two ends connecting respectively to the spherical coupling section 43 and the case 31.

Refer to FIG. 3 for the multimedia device 30 of the invention installed on the display panel 20. The display panel 20 has a trough corresponding to the pivotal member 40. The trough consists of a round hole 21 and a latch aperture 22. The display panel 20 further has a housing space 24 abutting the round hole 21 and the latch aperture 22. A coupling member 90 is provided to press the spherical coupling section 43 housed in the round hole 21. The coupling member 90 is coupled with a spring 91, which has another end pressing an anchor plate 23, located in the housing space 24. The anchor plate 90 and the spherical coupling section 43 form a resilient coupling relationship to define a use position for the multimedia device 30 on the display panel 20. And the multimedia device 30 may be turned freely on the display panel 20, so users can dynamically adjust the multimedia device 30 to a desired angle and direction. Therefore an excellent maneuverability may be achieved. In practice, the multimedia device 30 can also be turned in the direction where the display panel 20 is folding towards the host body 10. This will be discussed later.

Figure 4:
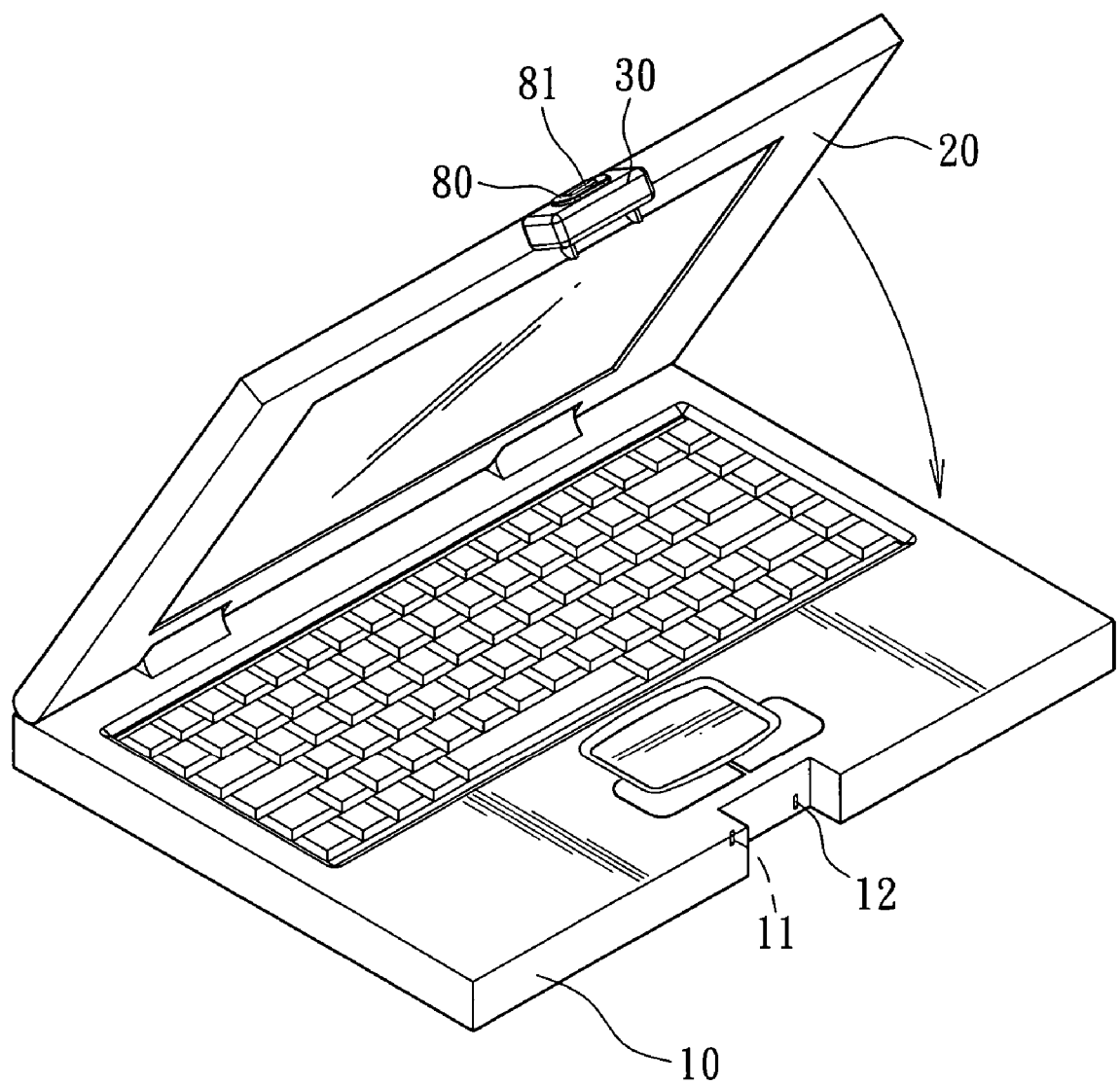
FIG. 4 is a schematic view of the multimedia device of the invention adopted for use on a portable computer in a folded condition.
Figure 5:
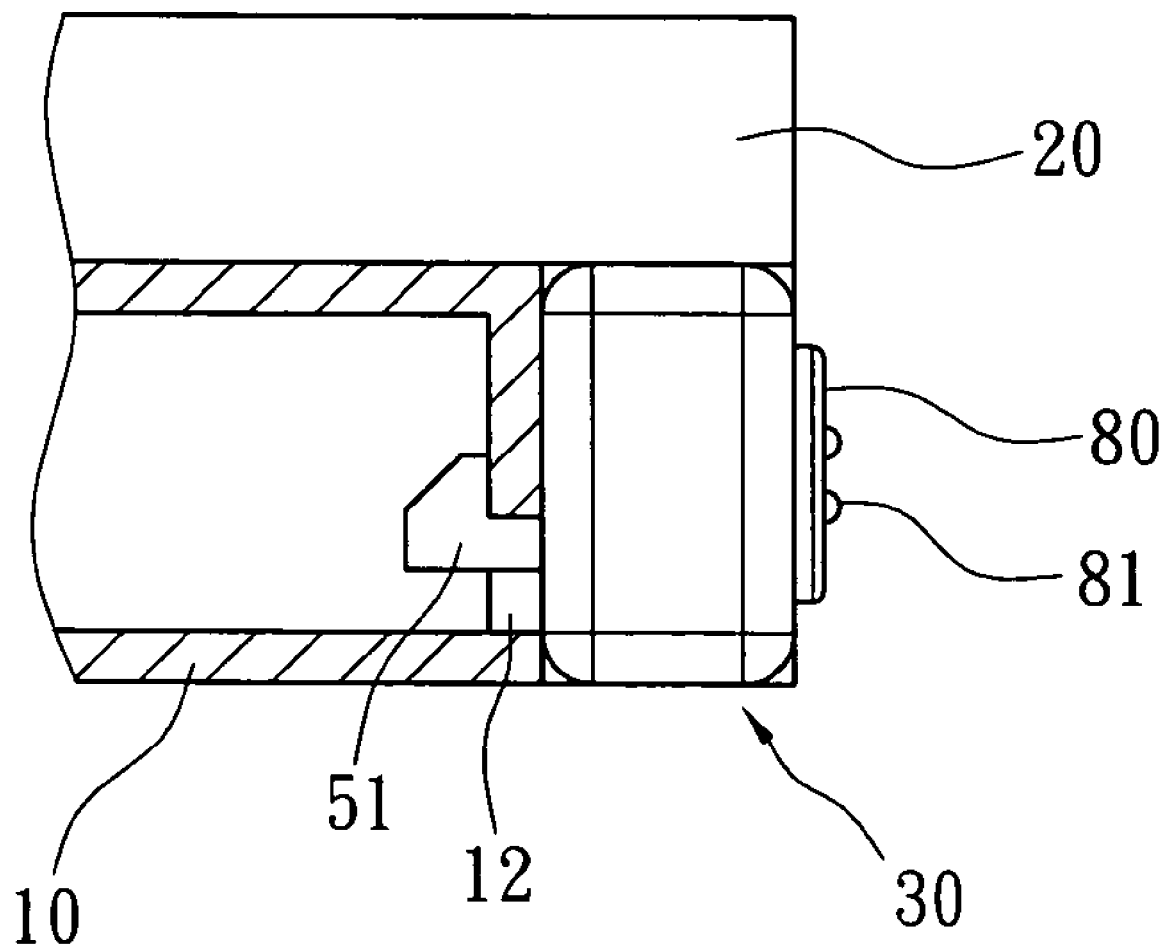
FIG. 5 is another schematic view of the multimedia device of the invention adopted for use on a portable computer in a folded condition.

Referring to FIGS. 4 and 5, when the display panel 20 is folding over the host body 10, the multimedia device 30 may be turned to a selected angle in the folding direction of the display panel 20 and housed in the housing trough 11 of the host body 10. This is defined as the coupling position for the multimedia device 30 and the display panel 20. Then the hook 51 of the latch member 50 can be latched in the latch slot 12 of the housing trough 11 in a vertical direction relative to the folding direction of the display panel 20. Thus the multimedia device 30 can be housed in the housing trough 11 and aligned on one side of the host body 10 to make the entire device more appealing in terms of appearance. And the display panel 20 can be closed and latched on the host body 10 in normal conditions.

When opening the portable computer for use, apply a force on the ridges 81. The bucking member 80 can be pushed easily to drive the latch member 50, and the hook 51 can be released from the latch slots 12 of the housing trough 11. Thereby, the display panel 20 can be unlatched from the host body 10. And the multimedia device 30 can be moved to the use position as shown in FIG. 3, and be turned freely as desired on the display panel 20.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A multimedia device for portable computers which consists of a host body and a display panel that are openable and foldable relative to each other, the multimedia device comprising:
    a case having a housing compartment for housing a plurality of electronic elements needed for operations, and a pivotal member on one side thereof, the pivotal member having a distal end and a through aperture, the distal end forming a spherical section to allow the case to be pivotally mounted on the display panel and to be turned freely thereon, the through aperture allowing a connection line of the multimedia device to run through to electrically connect to the host body; and
    a latch member located in the housing compartment having a hook exposed outside the case and being connected to an elastic member to allow the latch member to be moved relative to the case;
    wherein the hook latches the host body when the display panel is folded over the host body to keep the display panel and the host body closed in normal conditions.

2. The multimedia device of claim 1, wherein the latch member is movable linearly relative to the case.

3. The multimedia device of claim 1, wherein the elastic member is a spring.

4. The multimedia device of claim 1, wherein the case has a notch corresponding to the hook to expose the hook.

5. The multimedia device of claim 1 further having a bucking member located on one side of the case connecting to the latch member to control moving conditions of the latch member.

6. The multimedia device of claim 5, wherein the bucking member has one side forming a plurality of ridges to receive forces from users.

7. The multimedia device of claim 1, wherein the multimedia device is a video camera.

8. The multimedia device of claim 1, wherein the multimedia device is an audio equipment.

* * * * *